Aug. 23, 1932.  W. F. HEROLD  1,873,888
CASTER
Filed July 30, 1930
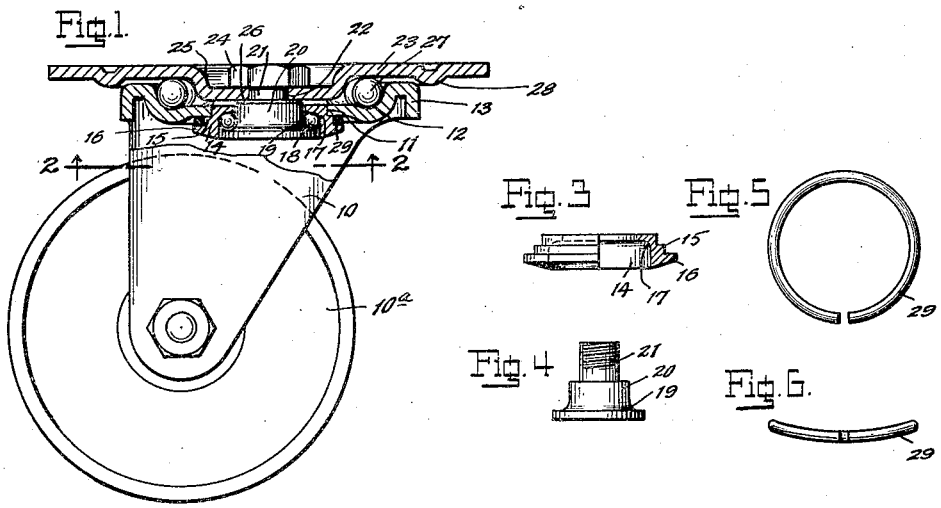
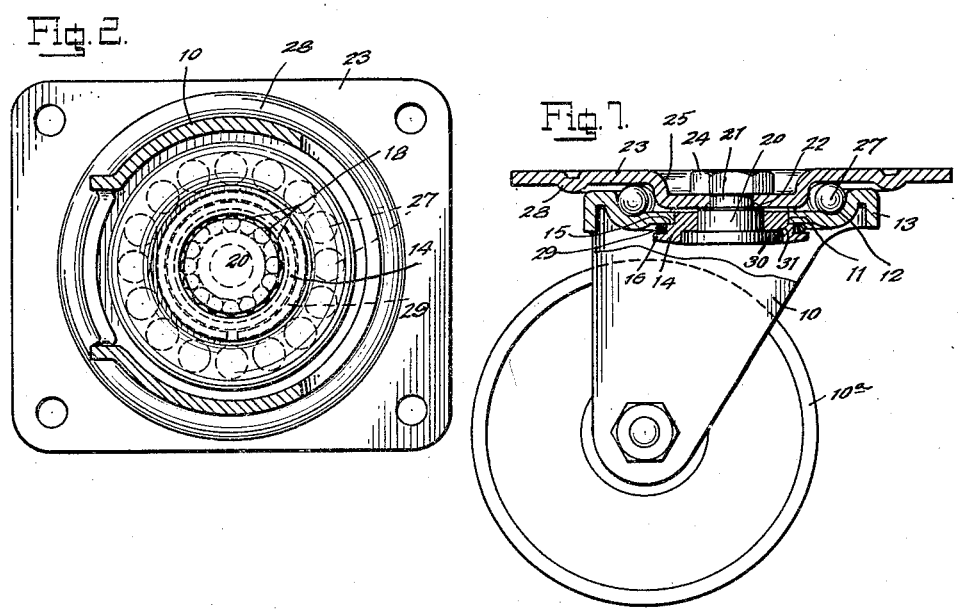
INVENTOR.
WALTER F. HEROLD.
BY
ATTORNEY Patented Aug. 23, 1932

1,873,888

UNITED STATES PATENT OFFICE

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT

CASTER

Application filed July 30, 1930. Serial No. 471,693.

The present invention relates to casters, and has for an object to provide a caster in which looseness between the relatively movable parts will be prevented at all times, irrespective of wear, variations in size resulting from manufacturing tolerances, and other causes. Heretofore it has been customary to mechanically adjust casters in assembling them to eliminate looseness and noise, but this was neither positive or lasting, and after very little wear such adjustment would be lost, and it is proposed in the present invention to obviate this, providing a snugly fitted assembly without necessity for adjustment, and which will maintain such snug relation under all conditions and irrespective of wear. The caster according to my invention will eliminate the noise and rattle caused when one or more of the casters of a set are out of engagement with the floor, unevenness in the mounting of the casters, or of the floor surface, usually causing at least one of a set of four casters to become disengaged from the floor surface as the supported object is rolled over it. In addition to noise and rattle, this condition causes excessive wear upon the caster parts, this being particularly true of ball-bearing casters, and in this respect the invention is especially desirable in connection with this type of casters.

Another object is to provide a caster having a sheet metal horn and a hardened center bearing ring, adapted to be loosely assembled therewith, and tightly retained in assembled relation with respect to the horn and other cooperating parts of the caster assembly.

With the above and other objects in view, embodiments of the invention are shown in the accompanying drawing, and these embodiments will be hereinafter more fully described with reference thereto, and the invention will be finally pointed out in the claims.

In the drawing:

Fig. 1 is a vertical sectional view of the caster, according to one embodiment of the invention, the lower portion of the horn and the wheel being shown in side elevation.

Fig. 2 is a bottom plan view, the horn being in section along the line 2—2 of Fig. 1.

Fig. 3 is a detail view partly in elevation, and partly in section, of the center bearing ring employed.

Fig. 4 is an elevation of the center stud employed.

Fig. 5 is a plan view of the spring member employed.

Fig. 6 is an edge view thereof.

Fig. 7 is a vertical sectional view of a modified form of the invention.

Similar reference characters indicate corresponding parts throughout the several figures of the drawings.

Referring to the drawing, the caster comprises a horn 10, preferably of pressed sheet metal, and in which the wheel $10^a$ is mounted. A central opening 11 is provided in the circular horn top and in concentric relation therewith an annular ball-race depression 12 is provided, the marginal portion of the top outwardly of the race being raised with respect to the inner portion and having a downwardly extending reinforcing flange 13.

A hardened ring 14 is loosely fitted in the opening 11 and is provided with a shoulder 15 engaging the under side of the horn top and a laterally extending flange 16 spaced below the horn top. The inner surface of the ring is provided with a ball race 17, antifriction balls 18 being disposed between this race and a cooperating ball-race 19 provided at the lower end of the center stud 20.

The center stud 20 extends loosely through the ring 14, and is provided with a reduced threaded shank 21, engaged in a center opening 22 of the top plate 23, and having a nut 24 screwed thereon and disposed within the central recess 25 of the top plate. A washer 26 is disposed between the stud and the under side of the top plate and may be of any desired thickness to properly space the plate from the horn. The use of the washer compensates for variations resulting from the usual manufacturing tolerances.

A series of antifriction balls 27 is disposed between the under flat surface of the top plate and the ball-race 12.

An annular downwardly projected rib 28 is pressed in the top plate, which serves to reinforce it, and also to particularly close the space between the plate and horn to exclude dirt from the ball-race and retain grease therein, being disposed for this purpose in slightly spaced relation about the horn top.

In order to maintain the parts in tight but non-binding relation at all times, regardless of wear and looseness resulting from manufacturing tolerances, a split spring ring 29 is employed, this ring being of arcuate form as viewed from its edge (Fig. 6), so that under tension it exerts an equally distributed pressure upwardly and downwardly. The ring is placed in the recess formed by the flange 16 of the bearing ring, and through downward pressure on the bearing ring and upward pressure on the horn top maintains the tight relation of the load and side thrust bearings.

The shoulder 15 limits deflection of the spring ring 29 to a predetermined extent within its elastic limit.

In Fig. 7 I have shown a modification in which the antifriction balls between the ring 14 and the center stud are dispensed with, the bearing between these parts being simply a laterally extending flange 30 at the lower end of the stud and a recess 31 in the ring in which the flange is engaged. In other respects the construction and operation is similar to the embodiment disclosed in Figs. 1 to 6.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:—

1. In a caster, a floor engaging element including a horn, an attaching element, means rotatably connecting said horn to said attaching element, bearing means between said horn and said attaching element, and resilient means adapted to press said horn and said attaching element into relation with said bearing means to prevent looseness and to be depressed under the load imposed on said caster.

2. In a caster, a floor engaging element including a horn, an attaching element, means rotatably connecting said horn to said attaching element, antifriction rotatable bearing means between said horn and said attaching element, and resilient means adapted to press said horn and said attaching element into relation with said bearing means to prevent looseness and to be depressed under the load imposed on said caster.

3. In a caster, a floor engaging element including a horn having a top portion, an attaching element including a plate overlying the horn top means rotatably connecting said horn top to said plate, bearing means interposed between said horn top and said plate, and means adapted to resiliently press said horn top and plate toward each other to prevent looseness and to be depressed under the load imposed on said caster.

4. In a caster, a floor engaging element including a horn having a top portion provided with a central aperture, an attaching element including a plate overlying the horn top, a center stud secured to said plate and engaged in said aperture of the horn top and rotatably connecting said horn top to said plate, bearing means interposed between said horn top and said plate, and resilient means beneath said horn top exerting downward pressure on said center stud and upward pressure on said horn top to prevent looseness between said horn top and plate.

5. In a caster, a floor engaging element including a horn having a top portion provided with a central aperture and an annular ball-race groove surrounding said aperture, an attaching element including a plate overlying the horn top, a center stud secured to said plate and engaged in said aperture of the horn top and rotatably connecting said horn top to said plate, ball-bearings disposed in said annular groove of the horn top and engaging said plate, and resilient means exerting downward pressure on said center stud and upward pressure on said horn top to prevent looseness between said horn top and plate.

6. In a caster, a floor engaging element including a horn having a top portion provided with a central aperture, an attaching element, a center stud secured to said attaching element and engaged in said aperture of the horn top and including a laterally extending flange, a ring member loosely disposed in said aperture and extending above said flange of the center stud and beneath said horn top, and resilient means interposed between said ring and said horn top exerting downward pressure on said ring and center stud and upward pressure on said horn top to prevent looseness between said horn top and said attaching element.

7. In a caster, a floor engaging element including a horn having a top portion provided with a central aperture, an attaching element, a center stud secured to said attaching element and engaged in said aperture of the horn top and including a laterally extending flange having a ball-race surface, a ring member loosely disposed in said aperture having a ball-race surface extending above and opposed to said ball-race surface of the center stud and a flange extending beneath said horn top, balls interposed between said ball-race surfaces, and resilient means interposed between the flange of said ring and said horn top exerting downward pressure on said ring and center stud and upward pressure on said horn top to prevent looseness between said horn top and said attaching element.

8. In a caster, a floor engaging element including a horn having a top portion provided with a central aperture, an attaching element including a plate overlying the horn top, a center stud secured to said plate and engaged in said aperture of the horn top and including a laterally extending flange, bearing means interposed between said horn top and said plate, a ring member loosely disposed in said aperture and extending above said flange of the center stud and beneath said horn top, and resilient means interposed between said ring and said horn top exerting downward pressure on said ring and center stud and upward pressure on said horn top to prevent looseness between said horn top and plate.

9. In a caster, a floor engaging element including a horn having a top portion provided with a central aperture, an attaching element including a plate overlying the horn top, a center stud secured to said plate and engaged in said aperture of the horn top and including a laterally extending flange having a ball-race surface, bearing means interposed between said horn top and said plate, a ring member loosely disposed in said aperture having a ball-race surface extending above and opposed to said ball-race surface of the center stud and a flange extending beneath said horn top, balls interposed between said ball-race surfaces, and resilient means interposed between the flange of said ring and said horn top exerting downward pressure on said ring and center stud and upward pressure on said horn top to prevent looseness between said horn top and plate.

10. In a caster, a floor engaging element including a horn having a top portion provided with a central aperture, an attaching element including a plate overlying the horn top, a center stud secured to said plate and engaged in said aperture of the horn top and including a laterally extending flange having a ball-race surface, antifriction rotatable bearing means interposed between said horn top and said plate, a ring member loosely disposed in said aperture having a ball-race surface extending above and opposed to said ball-race surface of the center stud and a flange extending beneath said horn top, balls interposed between said ball-race surfaces, and resilient means interposed between the flange of said ring and said horn top exerting downward pressure on said ring and center stud and upward pressure on said horn to prevent looseness between said horn top and plate.

11. In a caster, a floor engaging element including a horn, an attaching element, means rotatably connecting said horn to said attaching element, bearing means between said horn and said attaching element, resilient means adapted to press said horn and said attaching element into relation with said bearing means to prevent looseness, and abutment means adapted to limit deflection of said resilient means to a partial predetermined extent and to non-resiliently support said horn upon said limited deflection of said resilient means.

12. In a caster, a floor engaging element including a horn having a top portion provided with a central aperture, an attaching element, a center stud secured to said attaching element and engaged in said aperture of the horn top a ring member loosely disposed in said aperture and retained therein by said center stud including a portion extending beneath and adapted to abut the under side of said horn top to limit relative vertical movement between them and a portion extending beneath and in spaced relation to said horn top, and resilient means interposed between said last mentioned portion of the ring and said horn top exerting downward pressure on said ring and center stud and upward pressure on said horn top to prevent looseness between said horn top and said attaching element.

Signed at Bridgeport, county of Fairfield, and State of Connecticut, this 26 day of July, 1930.

WALTER F. HEROLD.